United States Patent
Han et al.

(10) Patent No.: US 11,003,027 B2
(45) Date of Patent: May 11, 2021

(54) LIQUID CRYSTAL DISPLAY HAVING IMPROVED COLOR DISPLAY

(71) Applicant: Samsung Display Co., Ltd., Yongin-Si (KR)

(72) Inventors: Min-Joo Han, Seoul (KR); Hyo Sik Kim, Yongin-si (KR); Kyu Su Ahn, Seoul (KR); Dan Bi Yang, Gunpo-si (KR); Hee Hwan Lee, Hwaseong-si (KR); Hoon Kim, Ansan-si (KR); Ki Chui Shin, Seongnam-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/809,658

(22) Filed: Mar. 5, 2020

(65) Prior Publication Data

US 2020/0201125 A1 Jun. 25, 2020

Related U.S. Application Data

(63) Continuation of application No. 15/044,815, filed on Feb. 16, 2016, now Pat. No. 10,663,802.

(30) Foreign Application Priority Data

Feb. 17, 2015 (KR) .................. 10-2015-0024467

(51) Int. Cl.
 *G02F 1/1337* (2006.01)
 *G02F 1/1343* (2006.01)
 *G02F 1/1362* (2006.01)

(52) U.S. Cl.
 CPC .... *G02F 1/133707* (2013.01); *G02F 1/13624* (2013.01); *G02F 1/134345* (2021.01); *G02F 2203/30* (2013.01)

(58) Field of Classification Search
 CPC ......... G02F 1/133707; G02F 1/134309; G02F 2001/134345
 See application file for complete search history.

(56) References Cited

U.S. PATENT DOCUMENTS 8,208,106 B2 6/2012 Nakanishi et al.
9,274,377 B2 3/2016 Chang et al.
(Continued)

FOREIGN PATENT DOCUMENTS

KR 10-2001-0009651 A 2/2001
KR 10-2004-0021168 A 3/2004
(Continued)

OTHER PUBLICATIONS

Tien-Lun Ting et al., "A Novel Coupled Charge-Shared Structure on Polymer Sustained Alignment Mode," IDW/AD 12, 2012, pp. 941-944, ISSN-L 1883-2490/19/0941 2012 ITE and SID.
(Continued)

*Primary Examiner* — Michael H Carley
*Assistant Examiner* — Jonathan Y Jung
(74) *Attorney, Agent, or Firm* — Innovation Counsel LLP

(57) ABSTRACT

A liquid crystal display includes: a first pixel and a second pixel for displaying different colors, the first pixel and the second pixel each including a first sub-pixel electrode receiving a first voltage; a second sub-pixel electrode receiving a second voltage; an insulating layer disposed between the first sub-pixel electrode and the second sub-pixel electrode; and a common electrode receiving a common voltage. A first portion of the first sub-pixel electrode and a second portion of the second sub-pixel electrode overlap each other, a difference between the first voltage and the common voltage is larger than a difference between the second voltage and the common voltage, and a ratio of the second voltage to the first voltage for the first pixel is different from
(Continued)

a ratio of the second voltage to the first voltage for the second pixel.

12 Claims, 19 Drawing Sheets

(56) References Cited

U.S. PATENT DOCUMENTS

| | | | |
|---|---|---|---|
| 10,345,655 B2 | 7/2019 | Chang et al. | |
| 10,551,691 B2 | 2/2020 | Chang et al. | |
| 2009/0059152 A1* | 3/2009 | Kamada | G02F 1/133345 349/144 |
| 2011/0157537 A1* | 6/2011 | Chen | G02F 1/134336 349/158 |
| 2011/0170027 A1* | 7/2011 | Nakanishi | G02F 1/134309 349/33 |
| 2012/0154727 A1* | 6/2012 | Chang | G02F 1/133707 349/129 |
| 2012/0236245 A1* | 9/2012 | Jung | G02F 1/134336 349/144 |
| 2012/0326954 A1 | 12/2012 | Itsumi et al. | |
| 2013/0208225 A1* | 8/2013 | Kwon | G02F 1/134309 349/144 |
| 2013/0314640 A1 | 11/2013 | Kang | |
| 2016/0238905 A1 | 8/2016 | Han et al. | |
| 2020/0124926 A1 | 4/2020 | Chang et al. | |

FOREIGN PATENT DOCUMENTS

| | | |
|---|---|---|
| KR | 10-2006-0104394 A | 10/2006 |
| KR | 10-2010-0006190 A | 1/2010 |
| KR | 10-2010-0073285 A | 7/2010 |
| KR | 10-2013-0104521 A | 9/2013 |
| KR | 10-2014-0097905 A | 8/2014 |

OTHER PUBLICATIONS

Kun-Cheng Tien et al., "Premium Picture Quality by Super-Multi-Domain Polymer Sustained Alignment LCD Technology," SID 2012 Digest, 2012, pp. 371-374, ISSN 0097-966X/12/4301-0371 2012 SID.

* cited by examiner

LIQUID CRYSTAL DISPLAY HAVING IMPROVED COLOR DISPLAY

CROSS-REFERENCE TO RELATED APPLICATION

This application is a continuation application of U.S. patent application Ser. No. 15/044,815 filed on Feb. 16, 2016, which claims priority under 35 USC § 119 to Korean Patent Application No. 10-2015-0024467 filed in the Korean Intellectual Property Office on Feb. 17, 2015, the entire contents of which are incorporated herein by reference.

BACKGROUND

(a) Technical Field

Embodiments of the present invention relate generally to flat panel displays. More specifically, embodiments of the present invention relate to liquid crystal displays having improved color display.

(b) Description of the Related Art

A liquid crystal display is a common form of flat panel display that typically includes two display panels where field generating electrodes such as a pixel electrode and a common electrode are formed, with a liquid crystal layer interposed therebetween.

The liquid crystal display generates an electric field in a liquid crystal layer by applying voltages to the field generating electrodes, to determine orientations of liquid crystal molecules of the liquid crystal layer and to thereby control polarization of incident light, thus displaying an image.

The liquid crystal display includes switching elements each connected to pixel electrodes, and a plurality of signal lines such as data lines and gate lines for applying voltages to the pixel electrodes by controlling the switching elements.

A vertical alignment (VA) mode liquid crystal display is one in which the longitudinal axes of the liquid crystal molecules are arranged to be perpendicular to the upper and lower display panels when no electric field is applied. VA mode liquid crystal displays are characterized by relatively large contrast ratio and large reference viewing angle.

In order to create a side visibility that is approximately equal to front visibility in the vertical alignment mode LCD, a method of causing a difference in transmittance by dividing one pixel into two subpixels and applying different voltages to the two subpixels has been suggested. However, when dividing one pixel into two subpixels and differentiating transmittance, the luminance is increased at a low gray or high gray such that gray expression is difficult at the side, thereby deteriorating display quality. Also, when the grays of the plurality of pixels displaying different colors are equal to each other, due to the color display deviation, a color tone is changed.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a liquid crystal display having the advantages of eliminating a color tone change by preventing color display deviation, expressing an accurate gray in a low gray region, and preventing transmittance deterioration while side visibility is close to front visibility.

A liquid crystal display according to an exemplary embodiment of the present invention includes: a first pixel and a second pixel displaying different colors, the first pixel and the second pixel each including a first substrate; a first sub-pixel electrode disposed on the first substrate and receiving a first voltage; a second sub-pixel electrode disposed on the first substrate and receiving a second voltage; an insulating layer disposed between the first sub-pixel electrode and the second sub-pixel electrode; a second substrate facing the first substrate; and a common electrode disposed on the second substrate and receiving a common voltage. A first portion of the first sub-pixel electrode and a second portion of the second sub-pixel electrode overlap each other, a difference between the first voltage and the common voltage is larger than a difference between the second voltage and the common voltage, and a ratio of the second voltage to the first voltage for the first pixel is different from a ratio of the second voltage to the first voltage for the second pixel.

Each of the first and second pixels may further include: a first switching element connected to the first sub-pixel electrode; and a second switching element and a third switching element connected to the second sub-pixel electrode, wherein a ratio of a channel length to a channel width of one of the second switching element and the third switching element of the first pixel may be different from a ratio of the channel length to the channel width of one of the second switching element and the third switching element of the second pixel.

For each of the first and second pixels, the first portion of the first sub-pixel electrode may include a first subregion disposed under the insulating layer and a second subregion disposed on the insulating layer, and the first subregion and the second subregion may be connected to each other through a contact hole formed in the insulating layer.

Each of the first and second pixels may further include a gate line formed on the first substrate. For each of the first and second pixels, the second subregion of the first sub-pixel electrode may include a plurality of first branch electrodes, the second sub-pixel electrode may include a plurality of second branch electrodes, and a first angle between the first branch electrodes of the second subregion of the first pixel and the gate line may be different from a second angle between the first branch electrodes of the second subregion of the second pixel and the gate line.

For each of the first and second pixels, a size of an area of the second subregion of the first pixel may be different from a size of an area of the second subregion of the second pixel.

For each of the first and second pixels, the first portion of the first sub-pixel electrode may be substantially planar, and the second branch electrodes may collectively extend along a plurality of different directions.

A liquid crystal display according to another exemplary embodiment of the present invention may include: a first pixel and a second pixel displaying different colors, the first pixel and the second pixel each include a first substrate; a first sub-pixel electrode disposed on the first substrate and receiving a first voltage; a second sub-pixel electrode disposed on the first substrate and receiving a second voltage; and an insulating layer disposed between the first sub-pixel electrode and the second sub-pixel electrode. One pixel area includes a first region where a first portion of the first sub-pixel electrode is disposed, a second region where the second portion of the first sub-pixel electrode and a third portion of the second sub-pixel electrode overlap each other, and a third region where a fourth portion of the second sub-pixel electrode is disposed, and a ratio of the second voltage to the first voltage of the first pixel is different from a ratio of the second voltage to the first voltage of the second pixel.

According to exemplary embodiments of the present invention, an accurate gray in a low gray region may be expressed, and the transmittance deterioration may be prevented while side visibility may be maintained close to front visibility. Also, by preventing color display deviation, color tone change may be prevented.

DETAILED DESCRIPTION OF THE EMBODIMENTS

Figure 1:
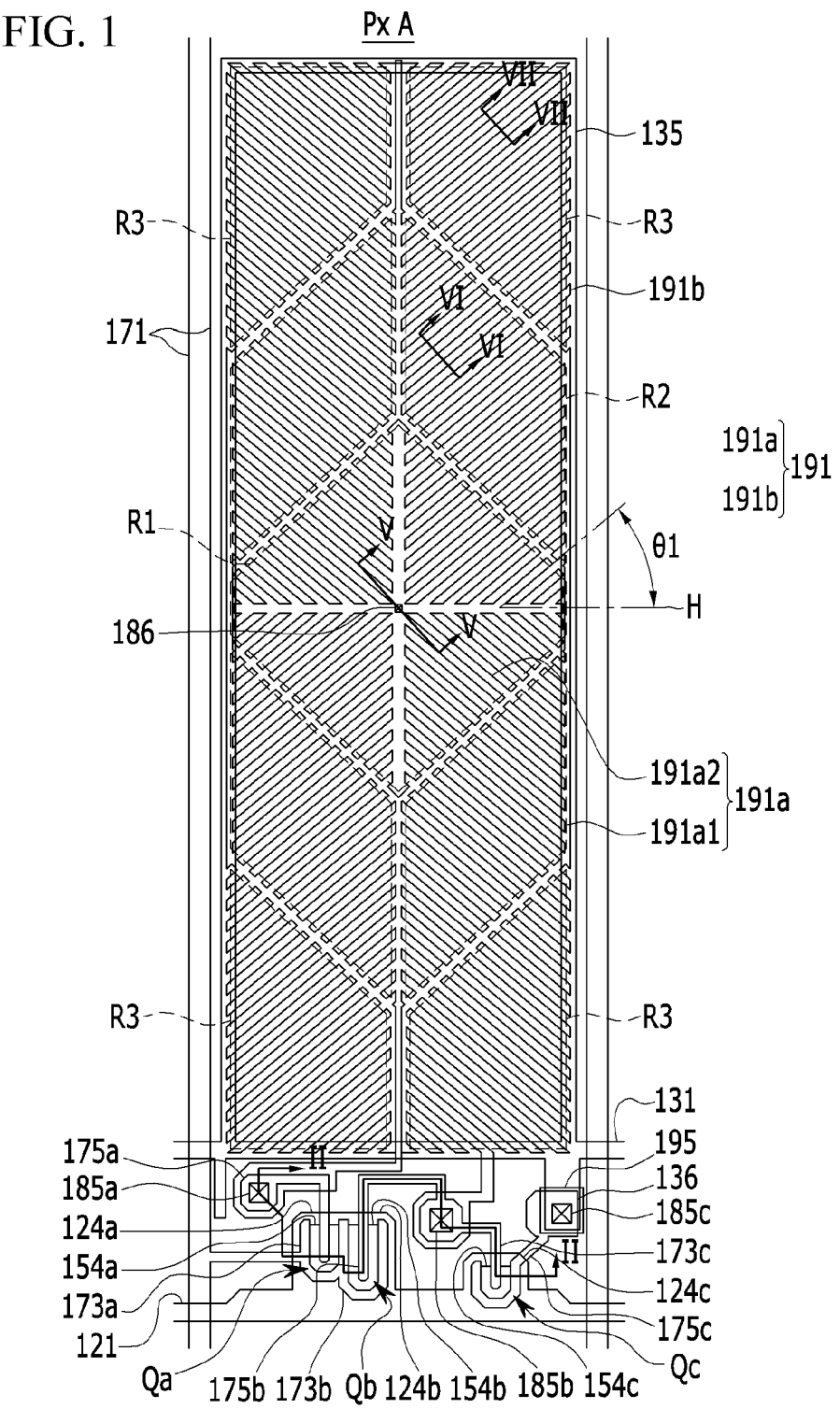
FIG. 1 is a layout view of a liquid crystal display according to an exemplary embodiment of the present invention.

Exemplary embodiments of the present invention will be described in detail with reference to the attached drawings. The present invention may be modified in many different forms and should not be construed as being limited to the exemplary embodiments set forth herein. Rather, the exemplary embodiments of the present invention are provided so that this disclosure will be thorough and complete, and will fully convey the concept of the present invention to those skilled in the art.

In the drawings, the thickness of layers and regions may be exaggerated for clarity. The various Figures thus may not be to scale. In addition, when a layer is described to be formed on another layer or on a substrate, this means that the layer may be formed on the other layer or on the substrate, or a third layer may be interposed between the layer and the other layer or the substrate. Like numbers refer to like elements throughout the specification. All numerical values are approximate, and may vary. All examples of specific materials and compositions are to be taken as nonlimiting and exemplary only. Other suitable materials and compositions may be used instead.

Figure 2:
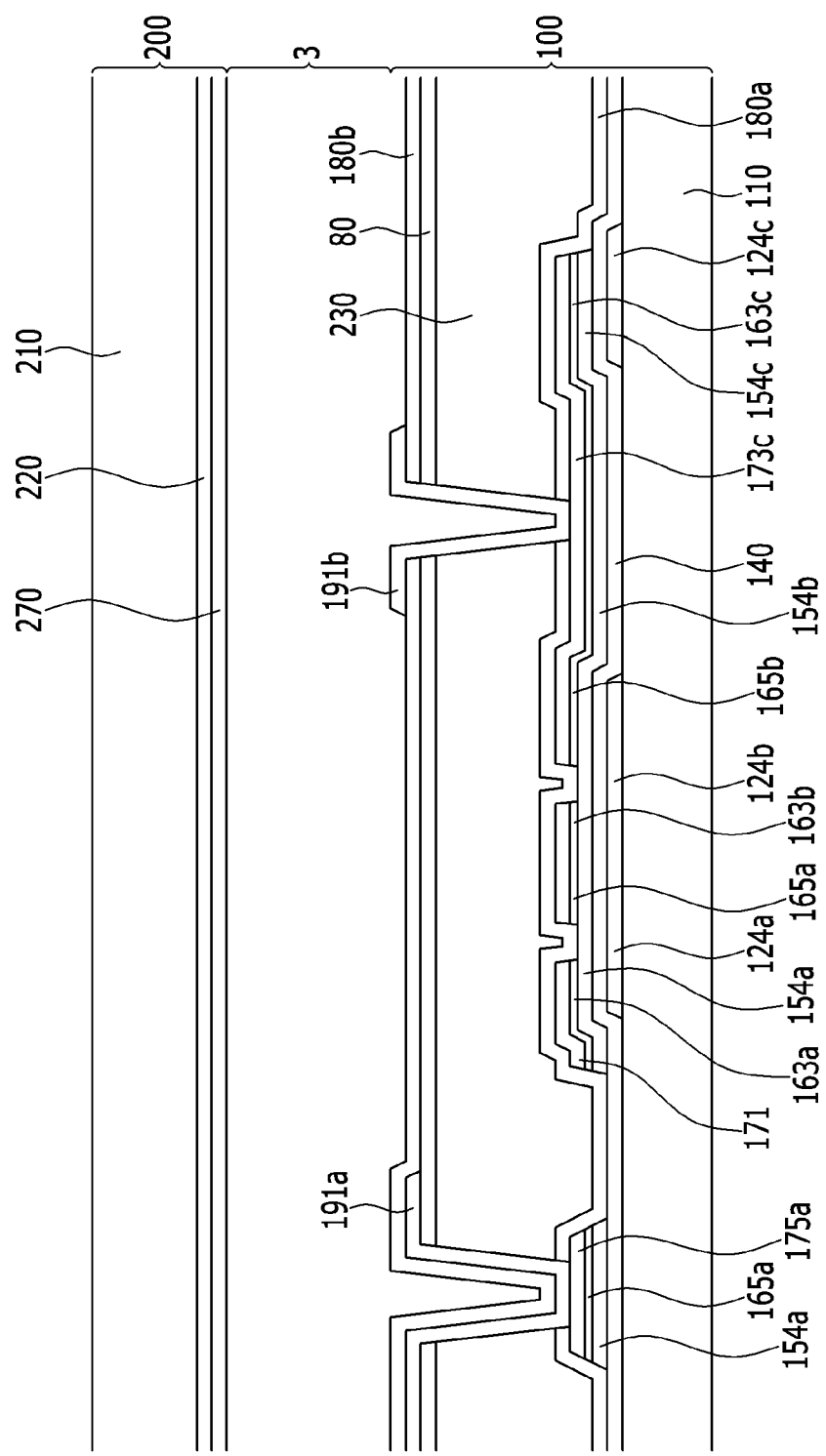
FIG. 2 is a cross-sectional view of the liquid crystal display of FIG. 1 taken along a line II-II.
Figure 3:
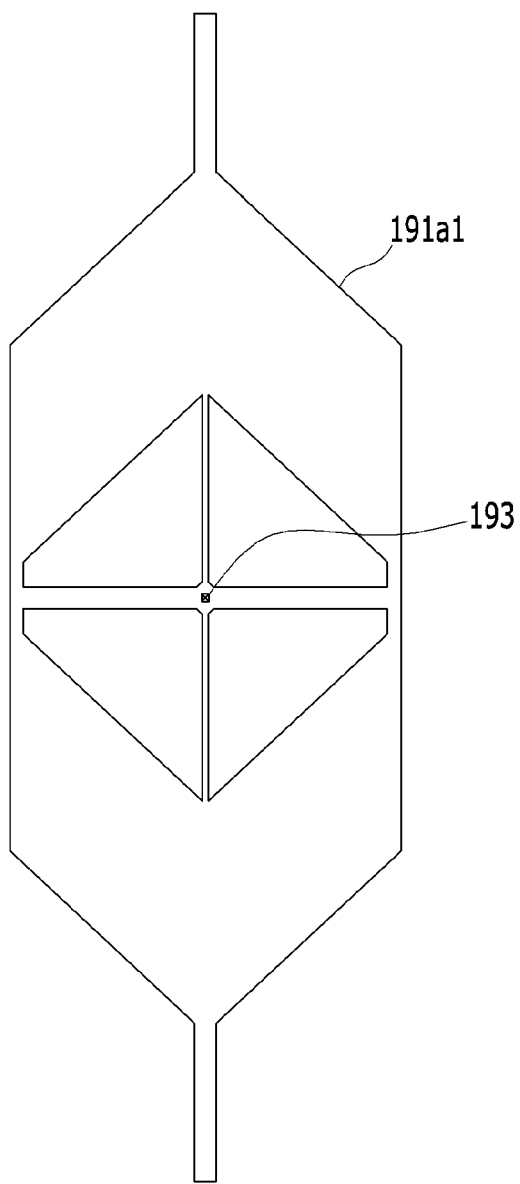
FIG. 3 is a layout view of a first sub-pixel electrode of the liquid crystal display of FIG. 1.
Figure 4:
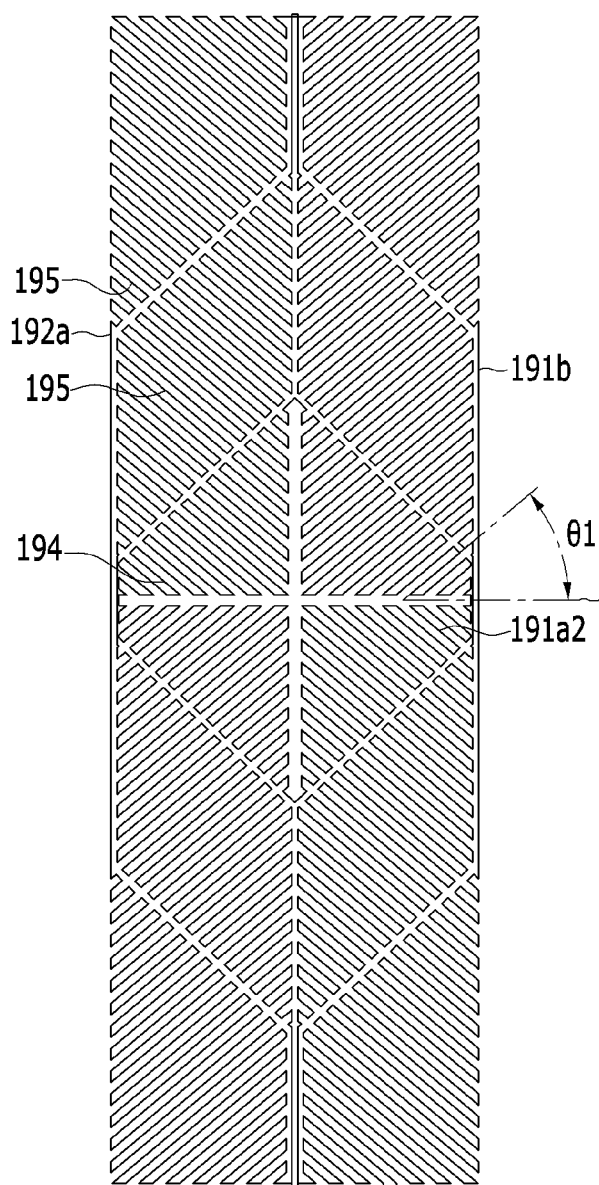
FIG. 4 is a layout view of a portion of a first sub-pixel electrode and a second sub-pixel electrode of the liquid crystal display of FIG. 1.
Figure 5:
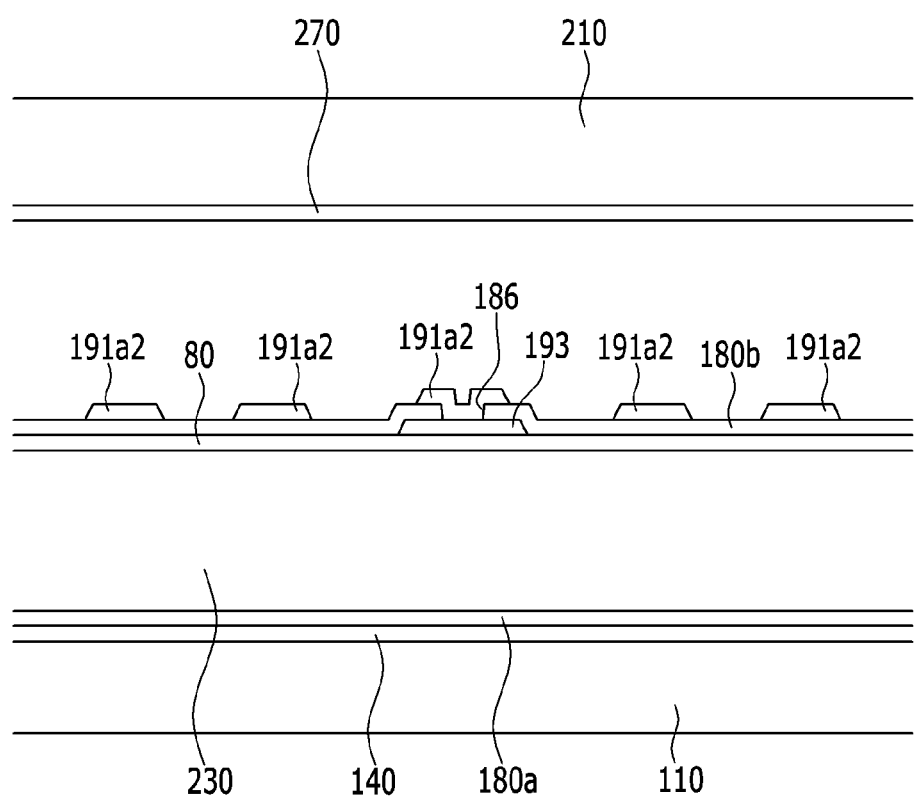
FIG. 5 is a cross-sectional view of the liquid crystal display of FIG. 1 taken along a line V-V.
Figure 6:
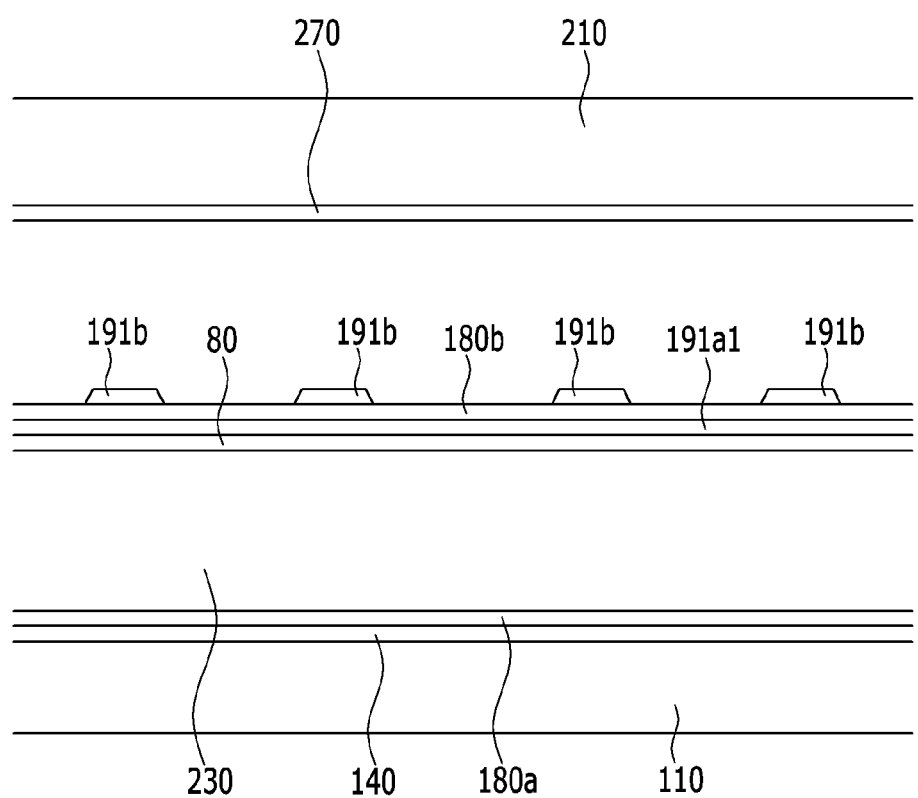
FIG. 6 is a cross-sectional view of the liquid crystal display of FIG. 1 taken along a line VI-VI.
Figure 7:
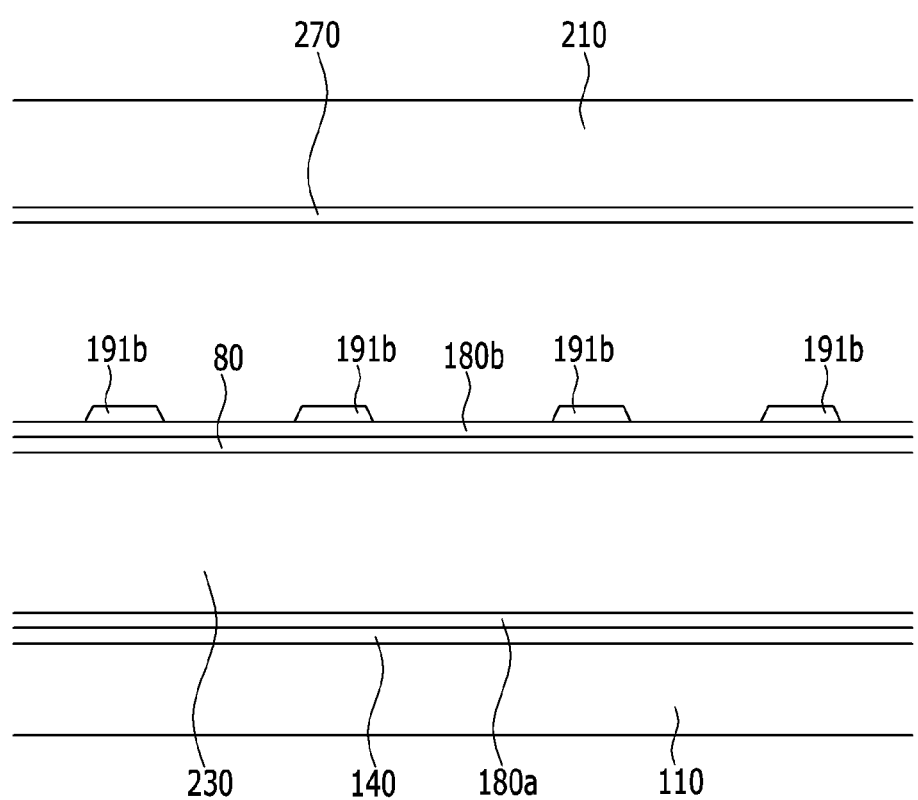
FIG. 7 is a cross-sectional view of the liquid crystal display of FIG. 1 taken along a line VII-VII.

Now, a liquid crystal display according to an exemplary embodiment of the present invention will be described with reference to FIG. 1 to FIG. 7. FIG. 1 is a layout view of a liquid crystal display according to an exemplary embodiment of the present invention. FIG. 2 is a cross-sectional view of the liquid crystal display of FIG. 1 taken along a line II-II. FIG. 3 is a layout view of a first sub-pixel electrode of the liquid crystal display of FIG. 1. FIG. 4 is a layout view of a portion of a first sub-pixel electrode and a second sub-pixel electrode of the liquid crystal display of FIG. 1. FIG. 5 is a cross-sectional view of the liquid crystal display of FIG. 1 taken along a line V-V. FIG. 6 is a cross-sectional view of the liquid crystal display of FIG. 1 taken along a line VI-VI. FIG. 7 is a cross-sectional view of the liquid crystal display of FIG. 1 taken along a line VII-VII.

First, referring to FIG. 1 and FIG. 2, a liquid crystal display according to the present exemplary embodiment includes a lower panel 100 and an upper panel 200 facing each other, and a liquid crystal layer 3 interposed between the two display panels 100 and 200.

Firstly, the lower panel 100 will be described.

A gate line 121, a reference voltage line 131, and a storage electrode 135 are formed on a first substrate 110 made of transparent glass or plastic. The gate line 121 transfers a gate signal and mainly extends in a transverse direction. The gate line 121 includes a first gate electrode 124a, a second gate electrode 124b, a third gate electrode 124c, and a wide end (not shown) for connection to other layers or to an external driving circuit.

The reference voltage line 131 may extend substantially parallel to the gate line 121 and have an expansion 136, and the expansion 136 is connected to a third drain electrode 175c that will be described later. The reference voltage line 131 includes the storage electrode 135 enclosing a pixel area.

A gate insulating layer 140 is formed on the gate line 121, the reference voltage line 131, and the storage electrode 135.

A first semiconductor 154a, a second semiconductor 154b, and a third semiconductor 154c that may be made of amorphous silicon or crystalline silicon are formed on the gate insulating layer 140.

A plurality of ohmic contacts 163a, 163b, 163c, 165a, and 165b are formed on the first semiconductor 154a, the second semiconductor 154b, and the third semiconductor 154c. When the semiconductors 154a, 154b, and 154c are formed with an oxide semiconductor, the ohmic contacts may be omitted.

Data conductors including a data line 171, a first source electrode 173a and a second source electrode 173b, a first drain electrode 175a, a second drain electrode 175b, a third source electrode 173c, and the third drain electrode 175c are formed on the ohmic contacts 163a, 163b, 163c, 165a, and 165b and the gate insulating layer 140.

The second drain electrode 175b is connected to the third source electrode 173c.

The first gate electrode 124a, the first source electrode 173a, and the first drain electrode 175a collectively form a first thin film transistor Qa along with the first semiconductor 154a, and a channel of the thin film transistor is formed in the semiconductor 154a between the first source electrode 173a and the first drain electrode 175a. Similarly, the second gate electrode 124b, the second source electrode 173b, and the second drain electrode 175b collectively form a second thin film transistor Qb along with the second semiconductor 154b, and a channel of the thin film transistor is formed in the semiconductor 154b between the second source electrode 173b and the second drain electrode 175b. Likewise, the third gate electrode 124c, the third source electrode 173c, and the third drain electrode 175c collectively form a third thin film transistor Qc along with the third semiconductor 154c, and a channel of the thin film transistor is formed in the semiconductor 154c between the third source electrode 173c and the third drain electrode 175c.

A first passivation layer 180a that may be made of an inorganic insulator such as a silicon nitride or a silicon oxide is formed on the data conductors 171, 173a, 173b, 173c, 175a, 175b, and 175c and exposed portions of the semiconductors 154a, 154b, and 154c.

A color filter 230 is disposed on the first passivation layer 180a.

A light blocking member (not shown) may be disposed on a region where the color filter 230 is not disposed and on a portion of the color filter 230. The light blocking member can be referred to as a black matrix and prevents light leakage.

An overcoat (capping layer) 80 is disposed on the color filter 230. The overcoat 80 prevents peeling of the color filter 230 and the light blocking member, and suppresses contamination of the liquid crystal layer 3 by an organic material of the solvent that flows from the color filter 230, so that it prevents defects such as afterimages that may occur when an image is driven.

Also, at least one of the color filter 230 and the light blocking member may be formed on the second display panel 200 rather than the first display panel 100.

A pixel electrode 191 is formed to include a first subpixel electrode 191a and a second subpixel electrode 191b. The first subpixel electrode 191a includes a first subregion 191a1 and a second subregion 191a2. The first subregion 191a1 of the first subpixel electrode 191a is disposed on the capping layer 80.

Referring to FIG. 3, the first subregion 191a1 of the first subpixel electrode 191a has a shape in plan view that includes a cross-shaped connection portion disposed at the center of the pixel area, and four parallelograms which are disposed around the cross-shaped connection portion to surround the cross-shaped connection portion. A first extension portion 193 is disposed at the center of the cross-shaped connection portion. Further, a protrusion extending upward and downward from a horizontal center of the pixel area is formed. As such, the first subregion 191a1 of the first subpixel electrode 191a is disposed within the pixel area.

The second passivation layer 180b is disposed on the capping layer 80 and the first subregion 191a1 of the first subpixel electrode 191a.

The second subregion 191a2 of the first subpixel electrode 191a, and the second subpixel electrode 191b, are disposed on the second passivation layer 180b.

Referring to FIG. 4, the second subregion 191a2 of the first subpixel electrode 191a is disposed at the central portion of its pixel, and the overall shape thereof is rhomboidal. The second subregion 191a2 of the first subpixel electrode 191a includes a cross stem including a transverse part and a longitudinal part, and a plurality of first branch electrodes 194 extending from the cross stem. The first branch electrodes 194 extend in four different directions.

The second sub-pixel electrode 191b is formed to enclose the second subregion 191a2 of the first sub-pixel electrode 191a. The second sub-pixel electrode 191b includes an outer stem 192a formed to enclose the second subregion 191a2 of the first sub-pixel electrode 191a, and a plurality of second branch electrodes 195 extend from the outer stem 192a.

Some of the second branch electrodes 195 of the second sub-pixel electrode 191b overlap the first subregion 191a1 of the first sub-pixel electrode 191a.

The first passivation layer 180a and the overcoat 80 have a first contact hole 185a formed therein and exposing a portion of the first drain electrode 175a; and the first passivation layer 180a, the overcoat 80, and the second passivation layer 180b have a second contact hole 185b exposing a portion of the second drain electrode 175b. The gate insulating layer 140, first passivation layer 180a, and the overcoat 80 have a third contact hole 185c exposing a portion of the expansion 136 of the third drain electrode 175c. Also, the second passivation layer 180b has a fourth contact hole 186 exposing the center portion of the first subregion 191a1 of the first sub-pixel electrode 191a.

The first subregion 191a1 of the first sub-pixel electrode 191a is physically and electrically connected to the first drain electrode 175a through the first contact hole 185a, and the second sub-pixel electrode 191b is physically and electrically connected to the second drain electrode 175b through the second contact hole 185b. Also, the second subregion 191a2 of the first sub-pixel electrode 191a is connected to the first extension portion 193 of the first sub-pixel electrode 191a through the fourth contact hole 186 formed in the second passivation layer 180b.

The first sub-pixel electrode 191a and the second sub-pixel electrode 191b receive the data voltage from the first drain electrode 175a and the second drain electrode 175b via the first contact hole 185a and the second contact hole 185b.

Next, the second display panel 200 will be described.

A light blocking member 220 and a common electrode 270 are formed on a second substrate 210 made of transparent glass or plastic.

However, in a case of a liquid crystal display according to another exemplary embodiment of the present invention, the light blocking member 220 may alternatively be disposed on the first display panel 100, and in a case of a liquid crystal display according to a further exemplary embodiment, the color filter disposed may alternatively be disposed in the second display panel 200.

Alignment layers (not shown) may be formed on inner surfaces of the display panels 100 and 200, and they may be vertical alignment layers.

A polarizer (not shown) may be provided on the outer surface of each of the two display panels 100 and 200. It is preferable that transmissive axes of the two polarizers be orthogonal to each other and that either transmissive axis is parallel to the gate line 121. However, the polarizer may only be disposed at one outer surface of the two display panels 100 and 200.

The liquid crystal layer 3 has negative dielectric anisotropy, and the liquid crystal molecules of the liquid crystal layer 3 may be aligned so that long axes thereof are perpendicular to the surface of the two display panels 100 and 200 in a state in which there is no electric field applied. Therefore, the incident light does not pass through the crossed polarizers but is blocked in a state in which there is no electric field.

At least one of the liquid crystal layer 3 and the alignment layer may include a photo-reactive material, more specifically, a reactive mesogen.

Next, a driving method for a liquid crystal display according to the exemplary embodiment of the present invention will be briefly described.

If a gate-on signal is applied to the gate line 121, the first gate electrode 124a, the second gate electrode 124b, and the third gate electrode 124c receive the gate-on signal such that the first switching element Qa, the second switching element Qb, and the third switching element Qc are turned on. Accordingly, the data voltage applied to the data line 171 is applied to the first subpixel electrode 191a and the second subpixel electrode 191b through the turned-on first switching element Qa and second switching element Qb. The voltage applied to the second subpixel electrode 191b is divided through the third switching element Qc connected in parallel to the second switching element Qb. Accordingly, the voltage applied to the second subpixel electrode 191b is lower than the voltage applied to the first subpixel electrode 191a.

Figure 19:
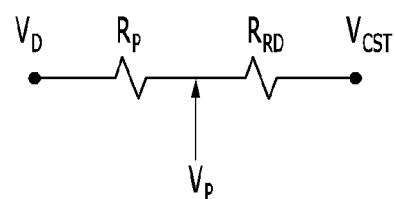
FIG. 19 illustrates an equivalent circuit of a pixel of embodiments of the present invention.

In this case, an equivalent circuit diagram between the data line transmitting the data voltage and the reference voltage line transmitting the voltage division reference voltage will be described. FIG. 19 illustrates this equivalent circuit diagram.

In FIG. 19, Vp is a second pixel voltage applied to the second sub-pixel electrode 191b, Vd is a data voltage applied to the data line 171, Vcst is a voltage division reference voltage, Rp is a first resistance value of a second switching element Qb connected between the data line and the second sub-pixel electrode 191b, and Rrd is a second resistance value of a third switching element Qc connected between the second sub-pixel electrode 191b and the voltage division reference voltage line 131.

The second pixel voltage Vp applied to the second sub-pixel electrode 191b is determined by the first resistance value Rp of the second switching element Qb, and the second resistance value Rrd of the third switching element Qc.

A current value flowing to the second sub-pixel electrode 191b is determined by a difference between the data voltage Vd and the second pixel voltage Vp divided by the first resistance value Rp, and is also the same as the difference between the second pixel voltage Vp and the voltage division reference voltage Vcst divided by the second resistance value Rrd.

Accordingly, the following equation is satisfied.

$$\frac{(Vd - Vp)}{Rp} = \frac{(Vp - Vcst)}{Rrd}$$

If the above equation is solved, $$Rrd(Vd-Vp)=Rp(Vp-Vcst)$$

$$(Rp+Rrd)Vp=Rrd \times Vd+Rp \times Vcst,$$

Vp is as follows.

$$Vp = \frac{Rrd}{(Rp + Rrd)} \times Vd + \frac{Rp}{(Rp + Rrd)} \times Vcst$$

Thus, the magnitude of the voltage applied to the second sub-pixel electrode 191b is determined by a ratio of the first resistance value Rp of the second switching element Qb and the second resistance value Rrd of the third switching element Qc.

As such, the second pixel voltage Vp applied to the second sub-pixel electrode 191b may determine the ratio with the first pixel voltage applied to the first sub-pixel electrode 191a, by controlling the first resistance value Rp of the second switching element Qb and the second resistance value Rrd of the third switching element Qc.

Also, the resistance R of the thin film transistor is proportional to the channel length L of the thin film transistor, and is inversely proportional to the channel width W.

$$R \propto \frac{L}{W}$$

Accordingly, by controlling the channel length L and the channel width W of the second switching element Qb and the third switching element Qc, the ratio of the second voltage applied to the second sub-pixel electrode 191b to the first voltage applied to the first sub-pixel electrode 191a may be controlled.

According to the liquid crystal display of another exemplary embodiment of the present invention, the ratio of the second voltage applied to the second sub-pixel electrode 191b to the first voltage applied to the first sub-pixel electrode 191a may be controlled in other manner, so that the first pixel and the second pixel can be made to display different colors.

The liquid crystal display according to an exemplary embodiment of the present invention may include first pixel PXA and second pixel PXB displaying different colors, and a first ratio between a first value which is the ratio of the channel length to the channel width of the second switching element Qb of the first pixel PXA and a second value which is the ratio of the channel length to the channel width of the third switching element Qc may be different from a second ratio between a third value which is the ratio of the channel length to the channel width of the second switching element Qb of the second pixel PXB and a fourth value which is the ratio of the channel length to the channel width of the third switching element Qc. For example, the first ratio of the first pixel PXA may be smaller or larger than the second ratio of the second pixel PXB.

Again referring to FIG. 1, one pixel area of the liquid crystal display according to the present exemplary embodiment is formed of a first region R1 where the second subregion 191a2 of the first sub-pixel electrode 191a is disposed, a second region R2 where a portion of the first subregion 191a1 of the first sub-pixel electrode 191a and the second branch electrodes 195 of the second sub-pixel electrode 191b overlap, and a third region R3 where the second branch electrodes 195 of the second sub-pixel electrode 191b are disposed.

The first region R1, the second region R2, and the third region R3 each have four subregions according to the direction that the first branch electrodes 194 of the first sub-pixel electrode 191a and the second branch electrodes 195 of the second sub-pixel electrode 191b extend, respectively.

The area of the second region R2 may be about two times the area of the first region R1. A sum of the area of the third region R3 and the area of the third region R3 may be about three times the area of the second region R2, and may be about six times the area of the first region R1.

Next, the first region R1, the second region R2, and the third region R3 of one pixel area of the liquid crystal display according to the present exemplary embodiment will be described with reference to FIG. 5 to FIG. 7.

Referring to FIG. 5, the first region R1 of one pixel area of the liquid crystal display according to the present exemplary embodiment is disposed in the first display panel 100, and the second subregion 191a2 and the common electrode 270 disposed in the second display panel 200 together generate the electric field. The second subregion 191a2 of the first sub-pixel electrode 191a includes the crossed-shape stem and the plurality of first branch electrodes 194 extending in four different directions. The plurality of first branch electrodes 194 may be inclined by about 40 degrees with reference to the gate line 121. By a fringe field generated by the edges of the plurality of the first branch electrodes 194, the liquid crystal molecules of the liquid crystal layer 3 disposed in the first region R1 are inclined in four different directions. In detail, since the horizontal component of the fringe field formed by the plurality of first branch electrodes 194 is perpendicular to the sides of the plurality of first branch electrodes 194, the liquid crystal molecules are affected by the fringe field at both sides of the plurality of first branch electrodes 194, thereby being inclined parallel to the length directions of the branch electrodes 194.

Referring to FIG. 6, the second region R2 of one pixel area of the liquid crystal display according to the present exemplary embodiment overlaps the plurality of second branch electrodes 195 of the second sub-pixel electrode 191b disposed in the first display panel 100 and the first subregion 191a1 of the first sub-pixel electrode 191a. Accordingly, the liquid crystal molecules of the liquid crystal layer 3 are arranged by the electric field formed between the plurality of second branch electrodes 195 of the second sub-pixel electrode 191b and the common electrode 270.

Since the plurality of second branch electrodes 195 extend in directions parallel to those of the plurality of first branch electrodes 194, the liquid crystal molecules of the liquid crystal layer 3 disposed in the second region R2 are inclined in four different directions like the liquid crystal molecules of the liquid crystal layer 3 disposed in the first region R1.

Next, referring to FIG. 7, the third region R3 of one pixel area of the liquid crystal display according to the present exemplary embodiment generates an electric field along the plurality of second branch electrodes 195 of the second sub-pixel electrode 191b disposed in the first display panel 100 and the common electrode 270 disposed in the second display panel 200. Since the plurality of second branch electrodes 195 extend directions parallel to those of the plurality of first branch electrodes 194, the liquid crystal molecules of the liquid crystal layer 3 disposed in the third region R3 are inclined in four different directions like the liquid crystal molecules of the liquid crystal layer 3 disposed in the first region R1 and the second region R2.

As described above, the magnitude of the second voltage applied to the second sub-pixel electrode 191b is smaller than the magnitude of the first voltage applied to the first sub-pixel electrode 191a.

Accordingly, the intensity of the electric field applied to the liquid crystal layer disposed in the first region R1 is largest, and the intensity of the electric field applied to the liquid crystal layer disposed in the third region R3 is smallest. Since the influence of the electric field of the first sub-pixel electrode 191a disposed under the second sub-pixel electrode 191b exists in the second region R2, the intensity of the electric field applied to the liquid crystal layer disposed in the second region R2 is smaller than the intensity of the electric field applied to the liquid crystal layer disposed in the first region R1 and is larger than the intensity of the electric field applied to the liquid crystal layer disposed in the third region R3. Accordingly, the intensity of the electric field applied to the liquid crystal layer 3 is decreased in order from the first region R1, to the second region R2, and to the third region R3.

Thus, in the liquid crystal display according to an exemplary embodiment of the present invention, by dividing one pixel area into three regions where the intensity of the electric field applied to the liquid crystal layer 3 is different, the inclination angle of the liquid crystal molecules is different in each region, and the luminance of each region is differentiated. As described above, if one pixel area is divided into three regions having different luminance, by smoothly controlling the change of the transmittance according to the gray, the transmittance according to the gray change may be prevented from being sharply changed in the high gray as well as the low gray, thereby correctly expressing the gray in the low gray and the high gray while side visibility is close to front visibility.

Also, because there is little separation interval between adjacent regions R1, R2 and R3, even though one pixel area is divided into a plurality of regions where the intensity of the electric field applied to the liquid crystal layer 3 is different, transmittance reduction of the pixel area may be prevented.

Also, as described above, the liquid crystal display according to an exemplary embodiment of the present invention may include the first pixel PXA and the second pixel PXB displaying the different colors, where a first ratio between a first value that is the ratio of the channel length to the channel width of the second switching element Qb of the first pixel PXA, to a second value that is the ratio of the channel length to the channel width of the third switching element Qc may be different from a second ratio between a third value that is the ratio of the channel length to the channel width of the second switching element Qb of the second pixel PXB, and a fourth value that is the ratio of the channel length to the channel width of the third switching element Qc. Thus, in the first pixel PXA and the second pixel PXB, by differentiating the ratio of the channel length to the channel width of the second switching element Qb and the ratio of the channel length to the channel width of the third switching element Qc, the ratio of the first voltage of the first sub-pixel electrode 191a and the second voltage applied to the second sub-pixel electrode 191b may be set to be different in the first pixel PXA than in the second pixel PXB. Accordingly, the luminances of the first pixel PXA and the second pixel PXB may be controlled to be different, thereby controlling a hue angle. For example, when the first pixel PXA displays red or green and the second pixel PXB displays blue, if the ratios of channel width to channel length of the second switching element Qb and the third switching element Qc are set so that the luminance of the second pixel PXB is larger than the luminance of the first pixel PXA, the blue luminance of the displayed color is increased. In detail, for example, by forming the ratio of the second voltage to the first voltage of the pixel displaying blue to be larger than the ratios of the second voltage to the first voltage of the pixels displaying red and green, the blue luminance may be increased, thereby controlling the hue angle.

In this way, in the liquid crystal display according to an exemplary embodiment of the present invention, by controlling the ratio of the voltages applied to the first sub-pixel electrode 191a and the second sub-pixel electrode 191b of the first pixel PXA and the second pixel PXB displaying different colors, the hue angle of the displayed color may be controlled.

Figure 8:
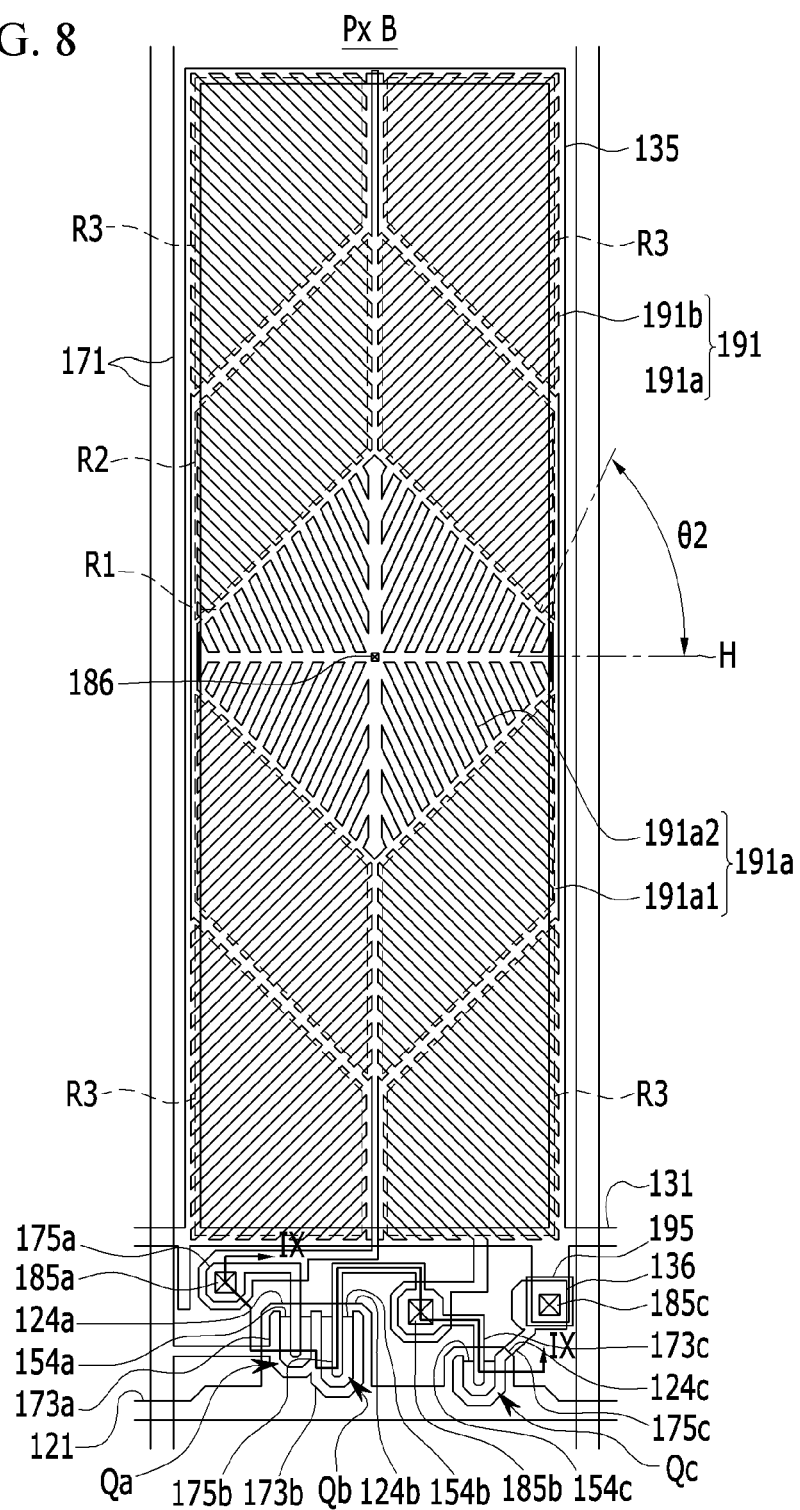
FIG. 8 is a layout view of a second pixel of a liquid crystal display according to another exemplary embodiment of the present invention.
Figure 9:
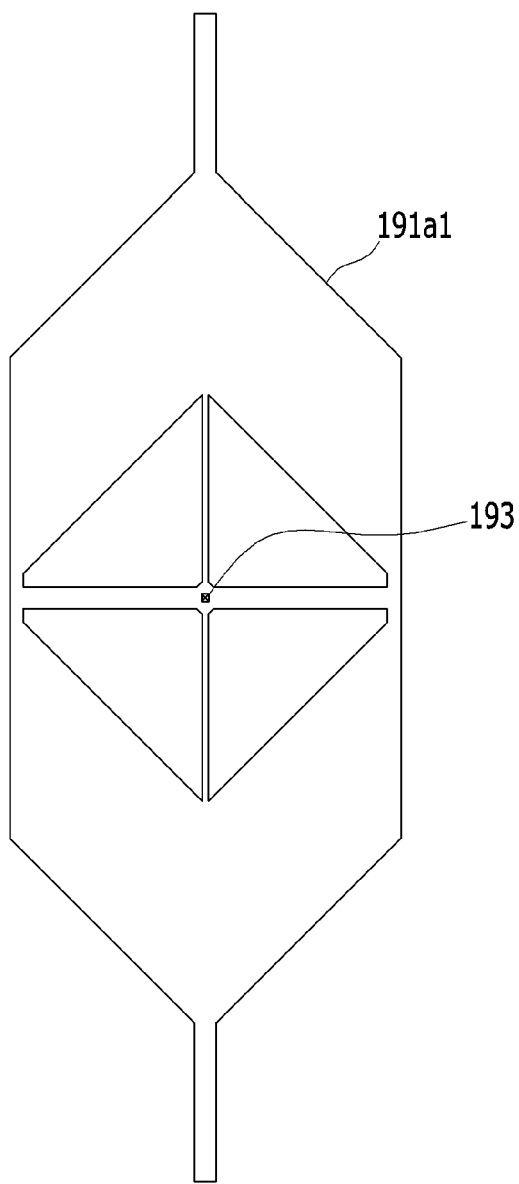
FIG. 9 is a layout view of a first sub-pixel electrode of a second pixel of the liquid crystal display of FIG. 8.
Figure 10:
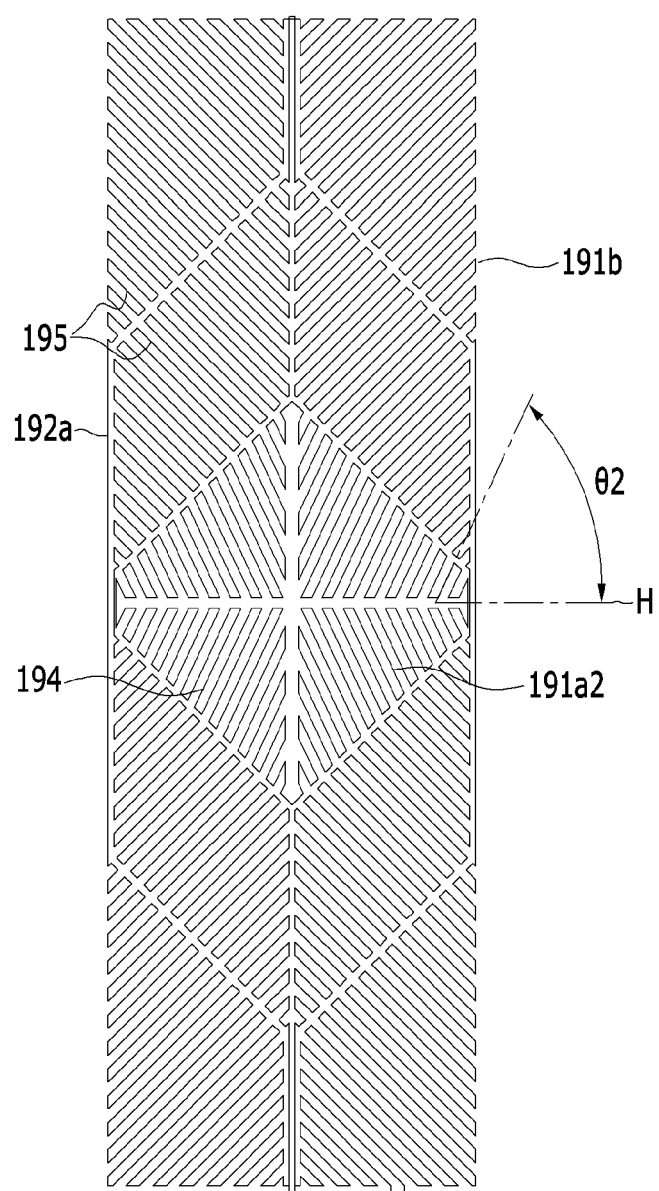
FIG. 10 is a layout view of a portion of a first sub-pixel electrode and a second sub-pixel electrode of a second pixel of the liquid crystal display of FIG. 8.

Next, the liquid crystal display according to another exemplary embodiment of the present invention will be described with reference to FIG. 8 to FIG. 10 as well as FIG. 1 to FIG. 4. FIG. 8 is a layout view of a second pixel of a liquid crystal display according to another exemplary embodiment of the present invention. FIG. 9 is a layout view of a first sub-pixel electrode of a second pixel of the liquid crystal display of FIG. 8. FIG. 10 is a layout view of a portion of a first sub-pixel electrode and a second sub-pixel electrode of a second pixel of the liquid crystal display of FIG. 8.

The liquid crystal display according to the present exemplary embodiment includes the first pixel PXA displaying the first color and a second pixel PXB displaying the second color.

The first pixel PXA includes a first sub-pixel electrode 191a and a second sub-pixel electrode 191b as in the exemplary embodiment shown in FIG. 1 to FIG. 4.

As described above, the first subregion 191a1 of the first sub-pixel electrode 191a of the first pixel PXA has a cross-shaped connection portion disposed in the center portion of the pixel area, and four parallelograms enclosing the cross-shaped connection portion. The first extension portion 193 is disposed in the center of the cross-shaped connection portion. Also, the first extension portion 193 has a protrusion extending upwardly and downwardly from the transverse center portion of the pixel area. Thus, the first subregion 191a1 of the first sub-pixel electrode 191a is disposed within the pixel area.

The second subregion 191a2 of the first sub-pixel electrode 191a of the first pixel PXA is disposed in the center portion of the pixel, and its outer edges outline a generally rhomboid shape when viewed in plan view. The second subregion 191a2 of the first sub-pixel electrode 191a includes the cross-shaped stem including the transverse portion and the longitudinal portion, and the plurality of first branch electrodes 194 extending from the crossed-shape stem. The first branch electrodes 194 extend in four directions.

The second sub-pixel electrode 191b of the first pixel PXA is formed to enclose or at least partially surround the second subregion 191a2 of the first sub-pixel electrode 191a, and includes the outer stem 192a formed to enclose the second subregion 191a2 of the first sub-pixel electrode 191a and the plurality of second branch electrodes 195 extending from the outer stem 192a.

Each portion of the second branch electrodes 195 of the second sub-pixel electrode 191b of the first pixel PXA overlaps the first subregion 191a1 of the first sub-pixel electrode 191a.

Referring to FIG. 8 to FIG. 10, the first sub-pixel electrode 191a and the second sub-pixel electrode 191b of the second pixel PXB of the liquid crystal display according to the present exemplary embodiment have similar shapes as the first sub-pixel electrode 191a and the second sub-pixel electrode 191b of the first pixel PXA described with reference to FIG. 1 to FIG. 4. The interlayer structure is substantially the same. Accordingly, detailed description of each layer is omitted.

However, as shown in FIG. 8 to FIG. 10, the first subregion 191a1 of the first sub-pixel electrode 191a of the second pixel has a cross-shaped connection portion disposed at the center of the pixel area and four parallelograms which are disposed around the cross-shaped connection portion to surround the cross-shaped connection portion. The first extension portion 193 is disposed at the center of the cross-shaped connection portion. Further, a protrusion extending upward and downward from a horizontal center of the pixel area is formed. As such, the first subregion 191a1 of the first subpixel electrode 191a is disposed within the pixel area.

The second subregion 191a2 of the first sub-pixel electrode 191a of the second pixel PXB is disposed at the central portion of the pixel, and the overall shape thereof is rhomboidal, i.e. as above its outer edges outline a generally rhomboid shape in plan view. The second subregion 191a2 of the first subpixel electrode 191a includes a cross-shaped stem including the transverse part and the longitudinal part, and a plurality of first branch electrodes 194 extending from the cross-shaped stem. The first branch electrodes 194 extend in four different directions.

The second sub-pixel electrode 191b of the second pixel PXB is formed to enclose the second subregion 191a2 of the first sub-pixel electrode 191a, and includes the outer stem 192a formed to enclose the second subregion 191a2 of the first sub-pixel electrode 191a and the plurality of second branch electrodes 195 extending from the outer stem 192a.

Each portion of the second branch electrodes 195 of the second sub-pixel electrode 191b of the second pixel PXB overlaps a portion of the first subregion 191a1 of the first sub-pixel electrode 191a.

A first angle θ1 between the first branch electrodes 194 of the first pixel PXA and the gate line 121 is different from a second angle θ2 between the first branch electrodes 194 of the second pixel PXB and the gate line 121. In detail, the first angle θ1 may be about 40 degrees, and the second angle θ2 may be about 45 degrees, although any numerical values are contemplated for θ1 and θ2, subject to the above constraints.

When the polarization axis of the polarizer (not shown) attached outside the first display panel 100 and/or the second display panel 200 forms an angle of about 45 degrees with the gate line 121, the luminance of the second pixel PXB is higher than that of the first pixel PXA. In this way, by differentiating the luminance of the first pixel PXA and the second pixel PXB displaying different colors, the hue angle may be controlled. For example, when the first pixel PXA displays red or green and the second pixel PXB displays blue, if the angle θ1 of the first pixel PXA is set so that the luminance of the second pixel PXB is larger than the luminance of the first pixel PXA, the blue luminance of the displayed color is increased.

Thus, in the liquid crystal display according to an exemplary embodiment of the present invention, by controlling the angle θ1 of the first pixel PXA and the second pixel PXB displaying different colors, the hue angle of the displayed color may be controlled.

Figure 11:
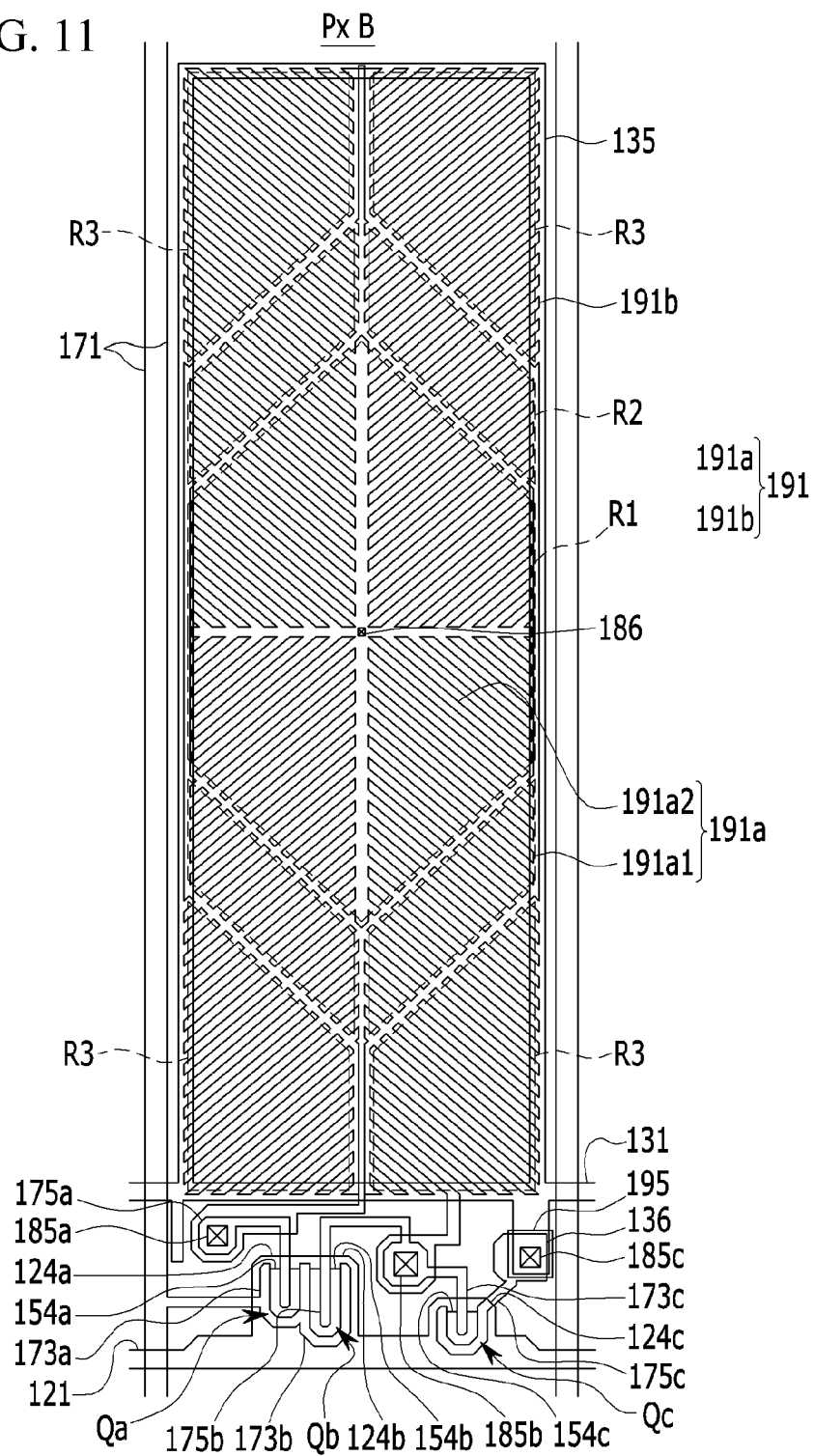
FIG. 11 is a layout view of a second pixel of a liquid crystal display according to another exemplary embodiment of the present invention.
Figure 12:
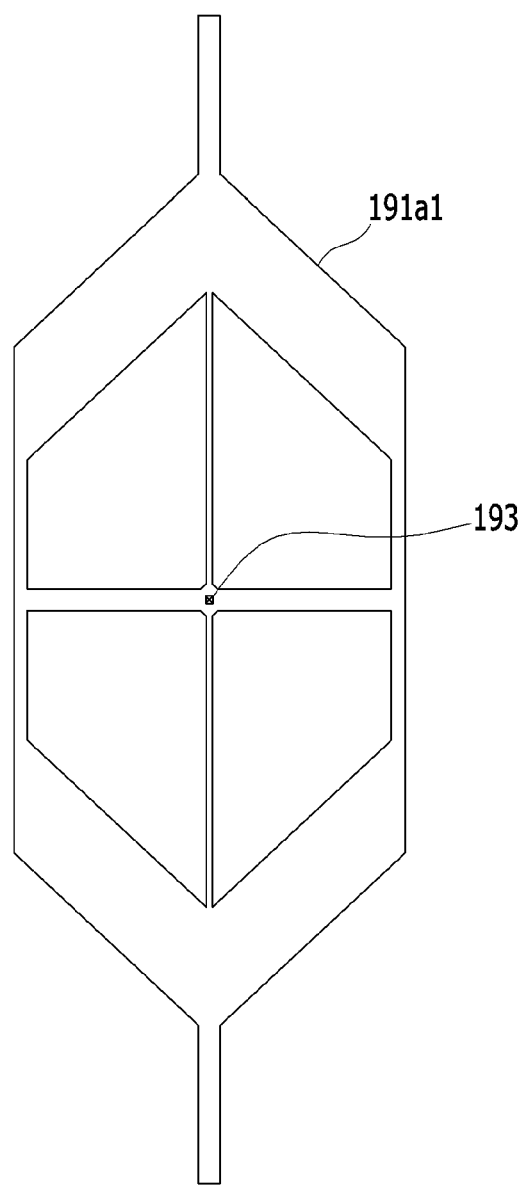
FIG. 12 is a layout view of a first sub-pixel electrode of a second pixel of the liquid crystal display of FIG. 11.
Figure 13:
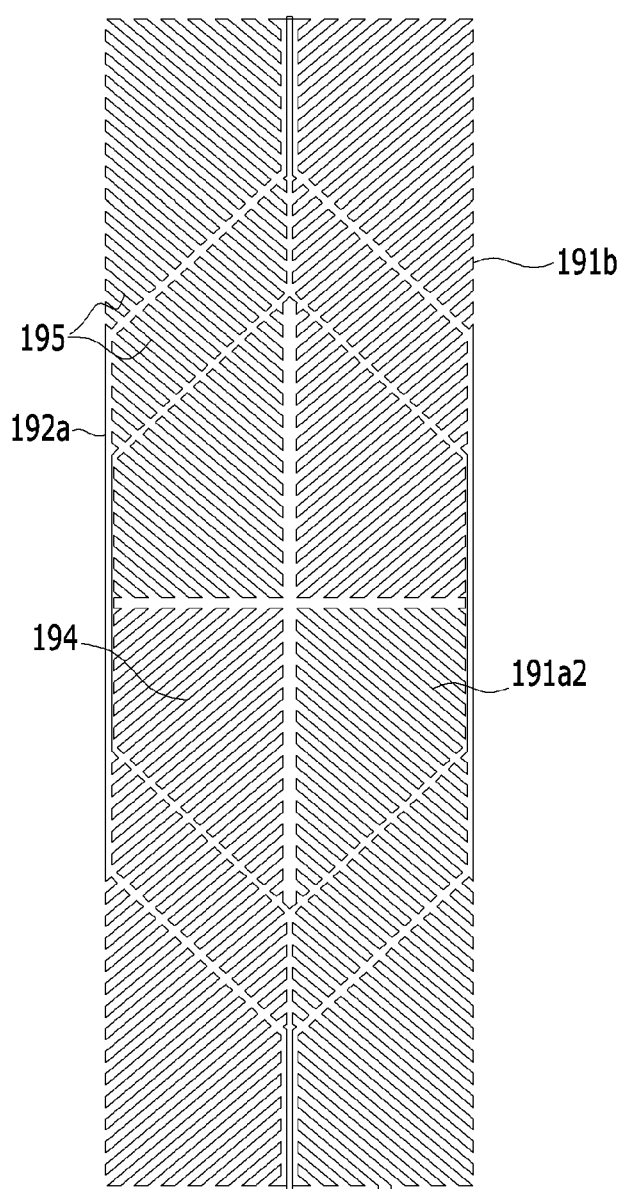
FIG. 13 is a layout view of a portion of a first sub-pixel electrode and a second sub-pixel electrode of a second pixel of the liquid crystal display of FIG. 11.

Next, the liquid crystal display according to another exemplary embodiment of the present invention will be described with reference to FIG. 11 to FIG. 13 as well as FIG. 1 to FIG. 4. FIG. 11 is a layout view of a second pixel of a liquid crystal display according to another exemplary embodiment of the present invention. FIG. 12 is a layout view of a first sub-pixel electrode of a second pixel of the liquid crystal display of FIG. 11. FIG. 13 is a layout view of a portion of a first sub-pixel electrode and a second sub-pixel electrode of a second pixel of the liquid crystal display of FIG. 11.

The liquid crystal display according to the present exemplary embodiment includes the first pixel PXA displaying the first color and the second pixel PXB displaying the second color.

The first pixel PXA includes the first sub-pixel electrode 191a and the second sub-pixel electrode 191b, as in the exemplary embodiment shown in FIG. 1 to FIG. 4.

As described above, the first subregion 191a1 of the first sub-pixel electrode 191a of the first pixel PXA has a cross-shaped connection portion disposed in the center portion of the pixel area, and four parallelograms enclosing the cross-shaped connection portion. The first extension portion 193 is disposed in the center of the cross-shaped connection portion. Also, the first extension portion 193 has the protrusion extending upwardly and downwardly from the transverse center portion of the pixel area. In this way, the first subregion 191a1 of the first sub-pixel electrode 191a is disposed within the pixel area.

The second subregion 191a2 of the first sub-pixel electrode 191a of the first pixel PXA is disposed in the center portion of the pixel, and as above has a generally rhomboid shape. The second subregion 191a2 of the first sub-pixel electrode 191a includes the crossed-shape stem including the transverse portion and the longitudinal portion, and the plurality of first branch electrodes 194 extending from the crossed-shape stem. The first branch electrodes 194 extend in four directions.

The second sub-pixel electrode 191b of the first pixel PXA is formed to enclose or at least partially surround the second subregion 191a2 of the first sub-pixel electrode 191a, and includes the outer stem 192a formed to enclose the second subregion 191a2 of the first sub-pixel electrode 191a and the plurality of second branch electrodes 195 extending from the outer stem 192a.

Parts of the second branch electrodes 195 of the second sub-pixel electrode 191b of the first pixel PXA overlap the first subregion 191a1 of the first sub-pixel electrode 191a.

Referring to FIG. 11 to FIG. 13, the first sub-pixel electrode 191a and the second sub-pixel electrode 191b of the second pixel PXB of the liquid crystal display according to the present exemplary embodiment are shaped similar to the first sub-pixel electrode 191a and the second sub-pixel electrode 191b of the first pixel PXA described with reference to FIG. 1 to FIG. 4. The interlayer structure is substantially the same. Accordingly, detailed description of each layer is omitted.

However, as shown in FIG. 11 to FIG. 13, the first subregion 191a1 of the first sub-pixel electrode 191a of the second pixel has a cross-shaped connection portion disposed at the center of the pixel area, and sides of subregion 191a1 outline four parallelograms which are disposed around the cross-shaped connection portion to surround the cross-shaped connection portion. The first extension portion 193 is disposed at the center of the cross-shaped connection portion. Further, a protrusion extending upward and downward from a horizontal center of the pixel area is formed. As such, the first subregion 191a1 of the first subpixel electrode 191a is disposed at a part of the pixel area.

The second subregion 191a2 of the first sub-pixel electrode 191a of the second pixel PXB is disposed at the central portion of the pixel, and outer edges thereof outline a generally rhomboidal shape. The second subregion 191a2 of the first subpixel electrode 191a includes a cross-shaped stem including the transverse part and the longitudinal part, and a plurality of first branch electrodes 194 extending from the cross stem. The first branch electrodes 194 extend in four different directions.

The second sub-pixel electrode 191b of the second pixel PXB is formed to at least partially surround or enclose the second subregion 191a2 of the first sub-pixel electrode 191a, and includes the outer stem 192a formed to enclose the second subregion 191a2 of the first sub-pixel electrode 191a. Also included is the plurality of second branch electrodes 195 extending from the outer stem 192a.

Some of the second branch electrodes 195 of the second sub-pixel electrode 191b of the second pixel PXB overlap the first subregion 191a1 of the first sub-pixel electrode 191a.

Referring to FIG. 11 to FIG. 13 along with FIG. 1 to FIG. 4, the area covered by the second subregion 191a2 of the first sub-pixel electrode 191a of the second pixel PXB is larger than the area covered by the second subregion 191a2 of the first sub-pixel electrode 191a of the first pixel PXA.

By increasing the size of the second subregion 191a2 of the first sub-pixel electrode 191a, the luminances of the first pixel PXA and the second pixel PXB may be differentiated. The size of the second subregion 191a2 of the second pixel PXB is larger than the first size of the second subregion 191a2 of the first pixel PXA, so that the luminance of the second pixel PXB is higher than the luminance of the first pixel PXA.

Thus, by differentiating the luminances of the first pixel PXA and the second pixel PXB displaying different colors, the hue angle may be controlled. For example, if the first pixel PXA displays red or green and the second pixel PXB displays blue and the size of the second subregion 191a2 of the second pixel PXB is larger than the size of the second subregion 191a2 of the first pixel PXA, the blue luminance is increased.

In the liquid crystal display according to an exemplary embodiment of the present invention, by controlling the sizes of the second subregions 191a2 of the first pixel PXA and the second pixel PXB displaying different colors, the hue angle of the displayed color may be better controlled.

Figure 14:
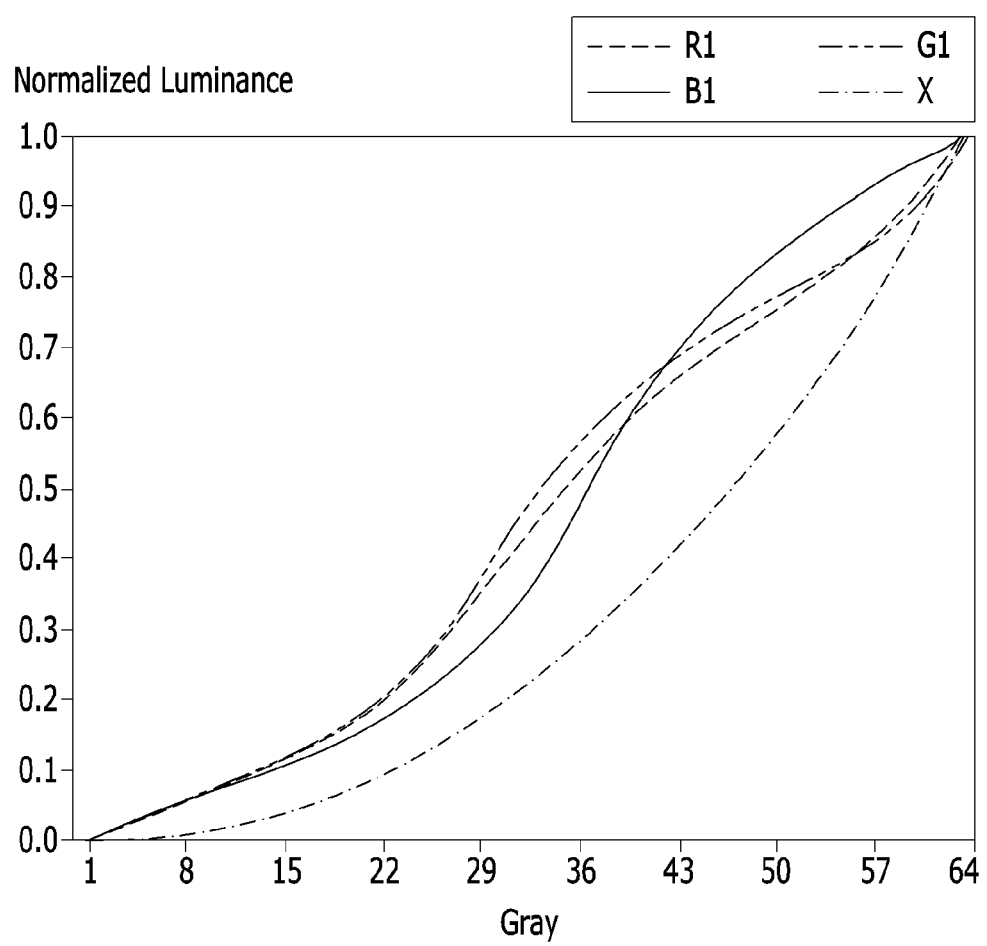
FIG. 14 and FIG. 15 are graphs showing the results of an experimental implementation of the present invention.
Figure 15:
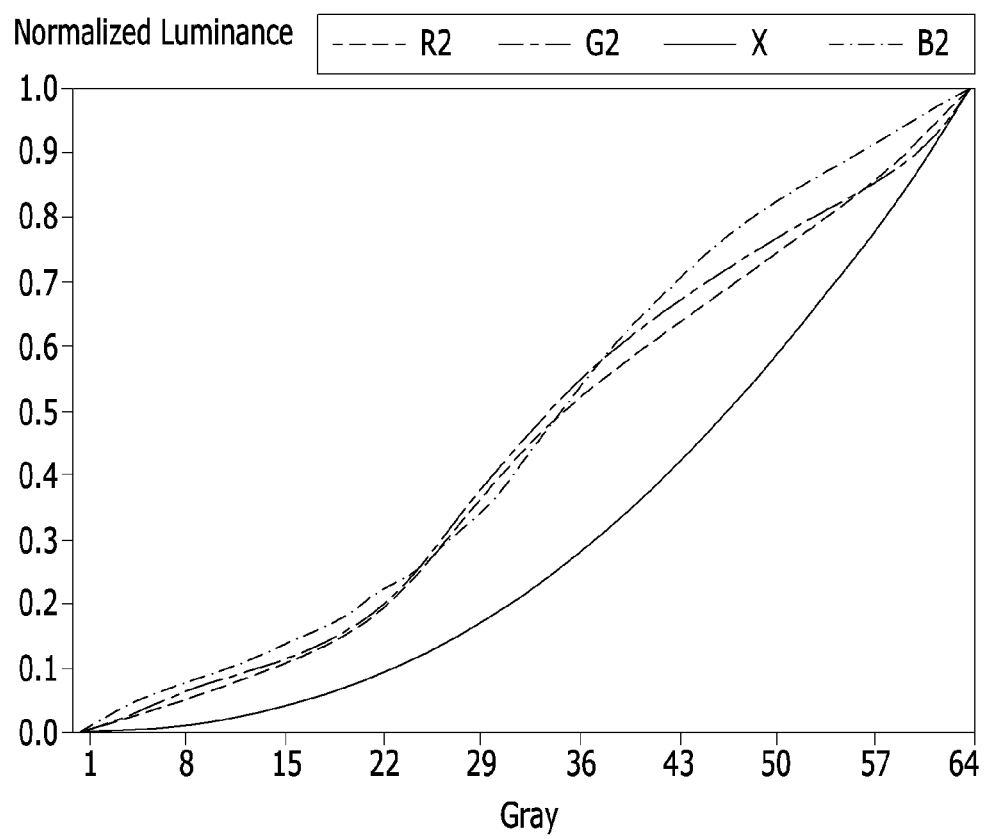

Next, experimental results of testing of a display constructed according to the present invention will be described with reference to FIG. 14 and FIG. 15. FIG. 14 and FIG. 15 are graphs showing results of testing of a display constructed according to an embodiment of the present invention.

FIG. 14 illustrates a first case in which the ratio of the second voltage applied to the second sub-pixel electrode 191b to the first voltage applied to the first sub-pixel electrode 191a of three pixels displaying red, green, and blue is about 0.65. In contrast, FIG. 15 illustrates a second case in which the ratio of the second voltage applied to the second sub-pixel electrode 191b to the first voltage applied to the first sub-pixel electrode 191a of the pixels displaying red and green is about 0.65, and the ratio of the second voltage applied to the second sub-pixel electrode 191b to the first voltage applied to the first sub-pixel electrode 191a of the pixel displaying blue is about 0.7. For these cases, the transmittance change as a function of gray in the front and the transmittance change as a function of gray at the lateral side are measured, and results are shown in FIG. 14 and FIG. 15.

Referring to FIG. 14, in the first case, a transmittance curve of blue at the lateral side is different from the transmittance curves of red and green. Particularly, the transmittance of blue is lower than the transmittances of red and green from gray values of about 22 to about 40.

However, referring to FIG. 15, in the second case, the transmittance curve of blue at the lateral side is almost the same as the transmittance curves of red and green. This demonstrates that, by controlling the ratio of the second voltage of the second sub-pixel electrode 191b to the first voltage applied to the first sub-pixel electrode 191a, the transmittance for each gray of the displayed color may be controlled.

Figure 16:
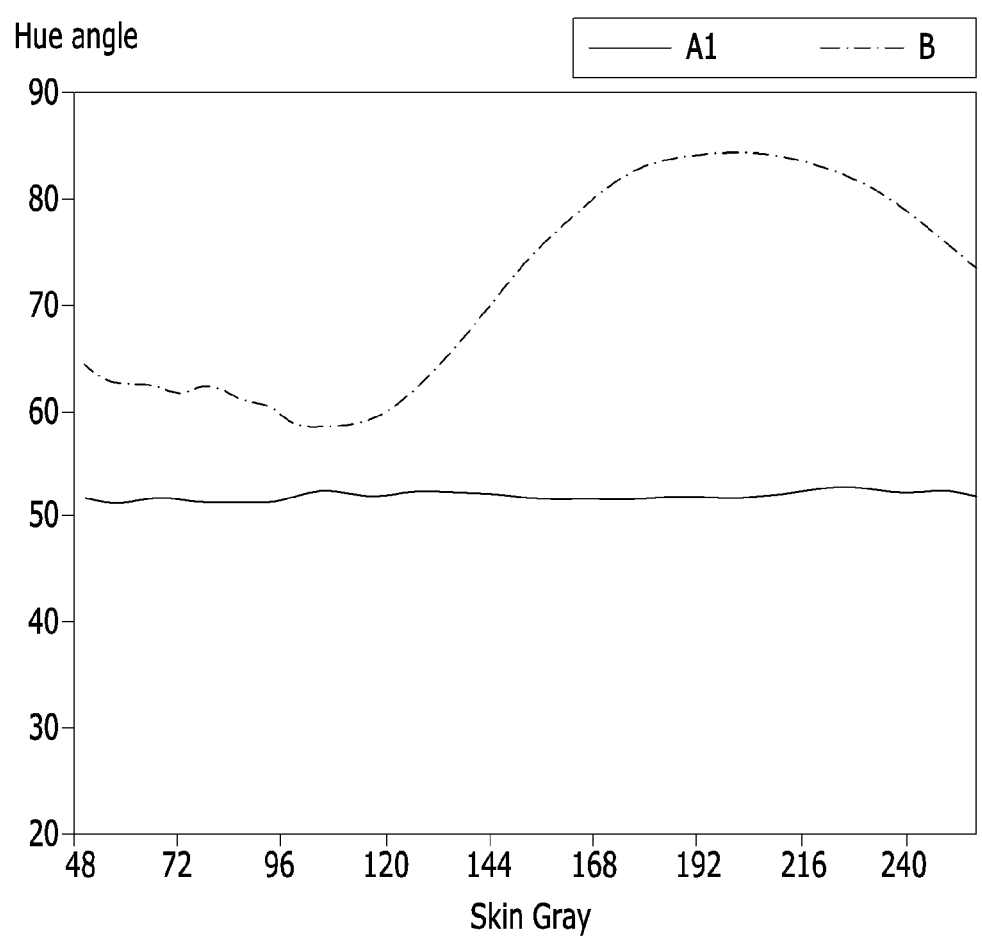
FIG. 16 and FIG. 17 are graphs showing further results of an experimental implementation of the present invention.
Figure 17:
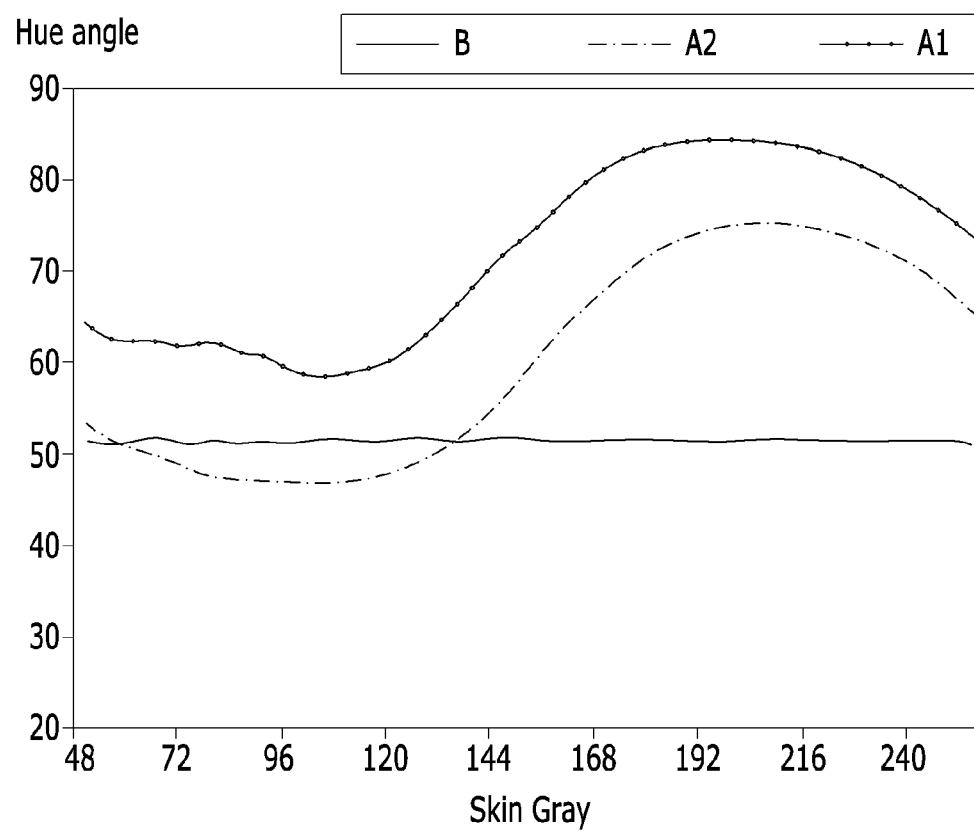

Next, further experimental results from testing a display according to the present invention will be described with reference to FIG. 16 and FIG. 17. FIG. 16 and FIG. 17 are graphs showing results of further testing of a display according to the present invention.

FIG. 16 presents results for a first case in which the ratio of the second voltage applied to the second sub-pixel electrode 191b to the first voltage applied to the first sub-pixel electrode 191a for three pixels displaying red, green, and blue is about 0.65. FIG. 17 presents results for a second case in which the ratio of the second voltage applied to the second sub-pixel electrode 191b to the first voltage applied to the first sub-pixel electrode 191a for the pixels displaying red and green is about 0.65, and the ratio of the second voltage applied to the second sub-pixel electrode 191b to the first voltage applied to the first sub-pixel electrode 191a of the pixel displaying blue is about 0.7. For these cases, the hue angle for the gray is measured, and results thereof are shown in FIG. 16 and FIG. 17.

Referring to FIG. 16, in the first case, the hue angle A1 for each gray at the lateral side is significantly different from the hue angle B for each gray viewed from the front. However, referring to FIG. 17, in the second case, the difference between the hue angle A2 for each gray at the lateral side and the hue angle B for each gray in the front is significantly less than that of the first case. This demonstrates that hue angle may be controlled by controlling the ratio of the second voltage of the second sub-pixel electrode 191b to the first voltage applied to the first sub-pixel electrode 191a.

Figure 18:
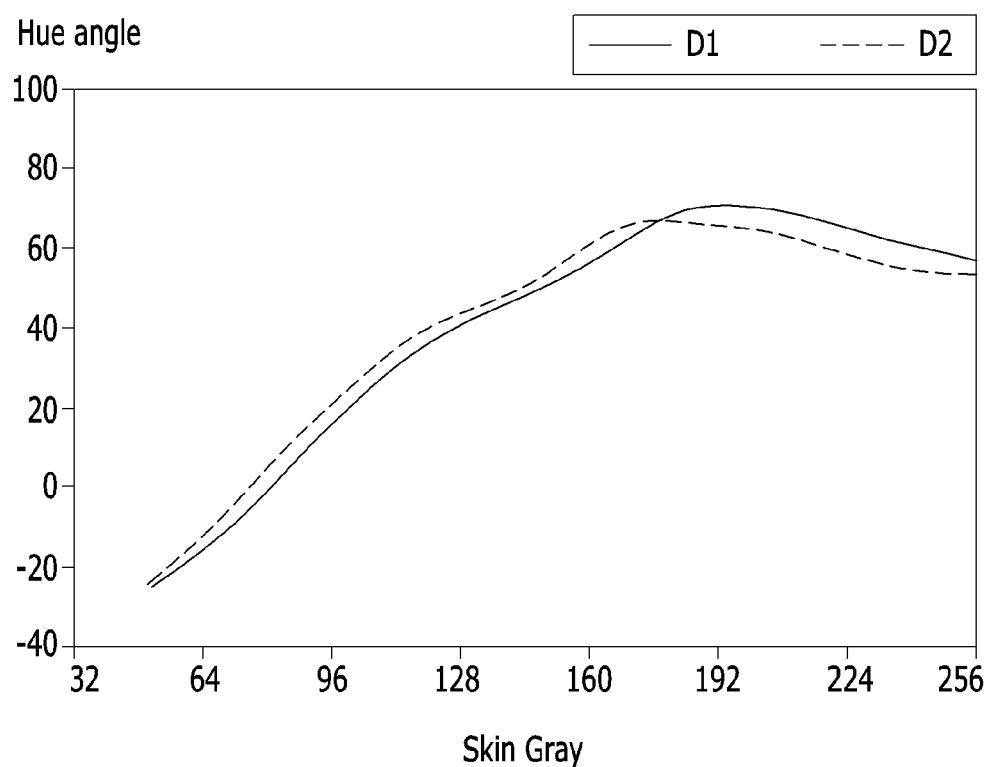
FIG. 18 is a graph showing a result of another experimental implementation of the present invention.

Next, further experimental results will be described with reference to FIG. 18. FIG. 18 is a graph showing further experimental results of testing of a display corresponding to an embodiment of the present invention.

In the present experimental example, the ratio of the second voltage applied to the second sub-pixel electrode 191b to the first voltage applied to the first sub-pixel electrode 191a of the first pixel PXA and the second pixel PXB is set to about 0.7. Then, FIG. 18 shows measured results for two cases. In the first case, the area ratio of the first region R1, the second region R2, and the third region R3 for the red pixel, the green pixel, and the blue pixel is 1:1.6:4.9. In the second, the area ratio of the first region R1, the second region R2, and the third region R3 for the red pixel and the green pixel is 1:1.6:4.9, while the area ratio of the first region R1, the second region R2, and the third region R3 for the blue pixel as 1:1.2:3.7. The hue angle for a skin gray is measured and a result thereof is shown in FIG. 18.

Referring to FIG. 18, in the curve D2 of the second case in which the ratio of the first region R1 of the blue pixel is relatively high compared with the curve D1 of the first case, the magnitude of the hue angle is reduced for the case that the value of the skin gray is large.

The skin gray is a gray value measured after setting the ratio of red:green:blue as 1:0.7:0.6. As the magnitude of the hue angle for the value of the skin gray is decreased, blue in the colors is increased, and as the magnitude of the hue angle is increased, the color becomes yellowish.

Accordingly, by controlling the magnitude of the high pixel of the pixels displaying the different colors, the hue angle as a function of gray value may be controlled.

Thus, by including a first pixel and a second pixel displaying different colors and by controlling the ratio of the magnitude of the voltage applied to the second sub-pixel electrode to the magnitude of the voltage applied to the first sub-pixel electrode for the first pixel and the second pixel, the luminance of the first pixel and the second pixel may be controlled, thereby controlling the hue angle.

Also, by including pixels of two different colors and by controlling the orientation of the plurality of branch electrodes of the first sub-pixel electrode and the second sub-pixel electrode of the first pixel and the second pixel, the luminance of the first pixel and the second pixel may be controlled, thereby further controlling the hue angle.

Also, by controlling the first pixel and the second pixel and by controlling the areas of the first sub-pixel electrode and the second sub-pixel electrode of the first pixel and the second pixel, the luminance of the first pixel and the second pixel may be controlled, thereby still further controlling the hue angle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

<Description of symbols>

| | |
|---|---|
| 100, 200: display panel | 110, 210: substrate |
| 124a, 124b, 124c: gate electrode | 140: gate insulating layer |
| 154a, 154b, 154c: semiconductor | 171: data line |
| 173a, 173b, 173c: source electrode | 175a, 175b, 175c: drain electrode |
| 180a, 180b: passivation layer | 191a, 191b: sub-pixel electrode |
| 194, 195: branch electrode | 220: light blocking member |
| 230: color filter | 270: common electrode |
| 3: liquid crystal layer | PXA, PXB: pixel |
| R1: first region | R2: second region |
| R3: third region | |

What is claimed is:

1. A liquid crystal display comprising:
a first pixel and a second pixel displaying different colors, the first pixel and the second pixel each comprising:
a first substrate;
a first sub-pixel electrode disposed on the first substrate and receiving a first voltage;
a second sub-pixel electrode disposed on the first substrate and receiving a second voltage;
an insulating layer disposed between the first sub-pixel electrode and the second sub-pixel electrode;
a second substrate facing the first substrate; and
a common electrode disposed on the second substrate and receiving a common voltage,
wherein:
a first portion of the first sub-pixel electrode and a second portion of the second sub-pixel electrode overlap each other,
the first portion of the first sub-pixel electrode includes a first subregion disposed under the insulating layer and a second subregion disposed on the insulating layer, the first subregion and the second subregion are connected to each other through a contact hole formed in the insulating layer,
a difference between the first voltage and the common voltage is larger than a difference between the second voltage and the common voltage, and
a size of an area of the second subregion of the first pixel is different from a size of an area of the second subregion of the second pixel.

2. The liquid crystal display of claim 1, wherein
the first portion of the first sub-pixel electrode is substantially planar,
the second subregion of the first sub-pixel electrode includes a plurality of first branch electrodes,
the second sub-pixel electrode includes a plurality of second branch electrodes, and
the second branch electrodes collectively extend along a plurality of different directions.

3. The liquid crystal display of claim 2, further comprising a gate line formed on the first substrate,
wherein a first angle between the first branch electrodes of the second subregion of the first pixel and the gate line is different from a second angle between the first branch electrodes of the second subregion of the second pixel and the gate line.

4. The liquid crystal display of claim 3, further comprising:
a first switching element connected to the first sub-pixel electrode; and
a second switching element and a third switching element connected to the second sub-pixel electrode,
wherein a ratio of a channel length to a channel width of one of the second switching element and the third switching element of the first pixel is different from a ratio of the channel length to the channel width of one of the second switching element and the third switching element of the second pixel.

5. The liquid crystal display of claim 1, further comprising a gate line formed on the first substrate, and wherein the second subregion of the first sub-pixel electrode includes a plurality of first branch electrodes,
wherein the second sub-pixel electrode includes a plurality of second branch electrodes, and
a first angle between the first branch electrodes of the second subregion of the first pixel and the gate line is different from a second angle between the first branch electrodes of the second subregion of the second pixel and the gate line.

6. The liquid crystal display of claim 5, further comprising:
a first switching element connected to the first sub-pixel electrode; and
a second switching element and a third switching element connected to the second sub-pixel electrode,
wherein a ratio of a channel length to a channel width of one of the second switching element and the third switching element of the first pixel is different from a ratio of the channel length to the channel width of one of the second switching element and the third switching element of the second pixel.

7. A liquid crystal display comprising:
a first pixel and a second pixel displaying different colors, the first pixel and the second pixel each comprising:
a first substrate;
a first sub-pixel electrode disposed on the first substrate and receiving a first voltage;
a second sub-pixel electrode disposed on the first substrate and receiving a second voltage; and
an insulating layer disposed between the first sub-pixel electrode and the second sub-pixel electrode,
wherein one pixel area includes a first region where a first portion of the first sub-pixel electrode is disposed,
a second region where a second portion of the first sub-pixel electrode and a third portion of the second sub-pixel electrode overlap each other,
a third region where a fourth portion of the second sub-pixel electrode is disposed, and
a size of an area of the first portion of the first pixel is substantially the same as a size of an area of the first portion of the second pixel.

8. The liquid crystal display of claim 7, wherein the second portion of the first sub-pixel electrode is substantially planar,
the first portion of the first sub-pixel electrode includes a plurality of first branch electrodes,
the third portion of the second sub-pixel electrode includes a plurality of second branch electrodes, and
the second branch electrodes collectively extend along a plurality of different directions.

9. The liquid crystal display of claim 8, further comprising a gate line formed on the first substrate,
wherein a first angle between the first branch electrodes of the first pixel and the gate line is different from a second angle between the first branch electrodes of the second pixel and the gate line.

10. The liquid crystal display of claim 9, further comprising:
a first switching element connected to the first sub-pixel electrode; and
a second switching element and a third switching element connected to the second sub-pixel electrode,
wherein a ratio of a channel length to a channel width of one of the second switching element and the third switching element of the first pixel is different from a ratio of a channel length to a channel width of one of the second switching element and the third switching element of the second pixel.

11. The liquid crystal display of claim 7, further comprising
a gate line formed on the first substrate,
wherein the first portion of the first sub-pixel electrode includes a plurality of first branch electrodes, and
a first angle between the first branch electrodes of the first pixel and the gate line is different from a second angle between the first branch electrodes of the second pixel and the gate line.

12. The liquid crystal display of claim 11, further comprising:
a first switching element connected to the first sub-pixel electrode; and
a second switching element and a third switching element connected to the second sub-pixel electrode,
wherein a ratio of a channel length to a channel width of one of the second switching element and the third switching element of the first pixel is different from a ratio of a channel length to a channel width of one of the second switching element and the third switching element of the second pixel.

* * * * *